United States Patent
Schmiedl et al.

(10) Patent No.: US 6,552,175 B2
(45) Date of Patent: Apr. 22, 2003

(54) REACTIVE DYES, A PROCESS FOR THEIR PREPARATION AND THEIR USE

(75) Inventors: Jürgen Schmiedl, Steinen (DE); Carlos Moyano, Grellingen (CH)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 0 days.

(21) Appl. No.: 10/112,157

(22) Filed: Mar. 29, 2002

(65) Prior Publication Data

US 2002/0138922 A1 Oct. 3, 2002

(30) Foreign Application Priority Data

Apr. 3, 2001 (CH) ................................ 626/01

(51) Int. Cl.[7] ...................... C09B 62/473; C09B 62/51; D06P 1/384

(52) U.S. Cl. ........................... 534/638; 8/549

(58) Field of Search ............... 534/638; 8/549

(56) References Cited

U.S. PATENT DOCUMENTS 5,554,733 A   9/1996 Tzikas et al. ............... 534/638
5,952,476 A * 9/1999 Phillips et al. .............. 534/637

FOREIGN PATENT DOCUMENTS

JP       50-157420       12/1975

OTHER PUBLICATIONS

Chem. Abstr. vol. 84:123388z (1976) for JP 50–157420.

* cited by examiner

*Primary Examiner*—Fiona T. Powers
(74) *Attorney, Agent, or Firm*—Kevin T. Mansfield

(57) ABSTRACT

Reactive dyes of formula

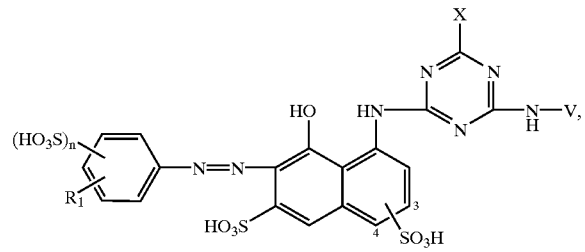

(1)

wherein
$R_1$ is halogen, $C_1$–$C_4$alkyl, $C_1$–$C_4$alkoxy, $C_2$–$C_4$alkanoylamino, $\alpha,\beta$-dihalopropionylamino or $\alpha$-haloacryloylamino,
X is halogen,
n is the number 0, 1 or 2, and
V is a radical of formula

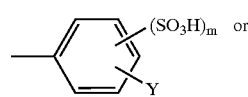

(2)

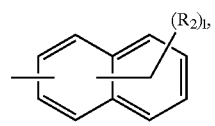

(3)

wherein
$(R_2)_l$ denotes 1 identical or different substituents selected from the group halogen, hydroxy, nitro, sulfo, $C_1$–$C_4$alkyl and $C_1$–$C_4$alkoxy,
Y is $\alpha,\beta$-dihalopropionylamino, $\alpha$-haloacryloylamino or a radical —CONH—$(CH_2)_{2-3}$—$SO_2$—Z and
Z is vinyl or a radical —$CH_2CH_2$—U and U is a group removable under alkaline conditions,
m is the number 0 or 1, and
l is the number 0, 1, 2 or 3, with the proviso that $R_1$ is not $\alpha,\beta$-dihalopropionylamino or $\alpha$-haloacryloylamino when V is a radical of formula (2) wherein Y is $\alpha,\beta$-dihalopropionylamino or $\alpha$-haloacryloylamino,
are suitable for the dyeing or printing of cellulosic fiber materials or natural or synthetic polyamide fiber materials, with a high colour yield, and give dyeings and prints having good fastness properties.

16 Claims, No Drawings

REACTIVE DYES, A PROCESS FOR THEIR PREPARATION AND THEIR USE

The present invention relates to novel reactive dyes, to a process for their preparation and to their use in the dyeing or printing of textile fibre materials.

The practice of dyeing using reactive dyes has recently led to higher demands being made on the quality of the dyeings and the profitability of the dyeing process. As a result, there continues to be a need for novel reactive dyes having improved properties, especially in respect of their application.

Dyeing nowadays requires reactive dyes that have sufficient substantivity and at the same time have good ease of washing off of unfixed dye. They should also have a good colour yield and high reactivity, the objective being to provide especially dyeings having high degrees of fixing. The known dyes do not satisfy these requirements in all properties.

The problem underlying the present invention is accordingly to find, for the dyeing and printing of fibre materials, novel improved reactive dyes having the qualities characterised above to a high degree. The novel dyes should especially be distinguished by high fixing yields and high fibre-dye bond stabilities. The dyes should also yield dyeings having good allround properties, for example fastness to light and to wetting.

It has been found that the problem posed is largely solved by the novel dyes defined herein-below, especially when the dyes are used for dyeing synthetic polyamide fibre materials.

The present invention therefore relates to reactive dyes of formula

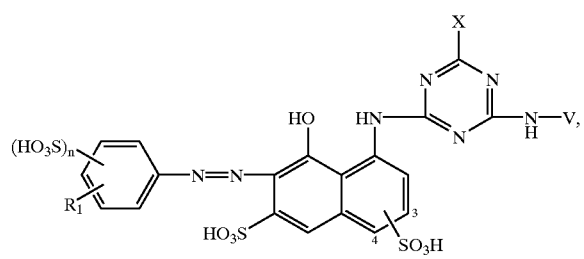

(1)

wherein
$R_1$ is halogen, $C_1$–$C_4$alkyl, $C_1$–$C_4$alkoxy, $C_2$–$C_4$alkanoylamino, α,β-dihalopropionylamino or α-haloacryloylamino,
X is halogen,
n is the number 0, 1 or 2, and
V is a radical of formula

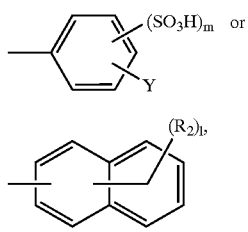

(2)

or (3)

wherein
$(R_2)_l$ denotes $l$ identical or different substituents selected from the group halogen, hydroxy, nitro, sulfo, $C_1$–$C_4$alkyl and $C_1$–$C_4$alkoxy, Y is α,β-dihalopropionylamino, α-haloacryloylamino or a radical —CONH—$(CH_2)_{2-3}$—$SO_2$—Z and
Z is vinyl or a radical —$CH_2CH_2$—U and U is a group removable under alkaline conditions,
m is the number 0 or 1, and
l is the number 0, 1, 2 or 3, with the proviso that
$R_1$ is not α,β-dihalopropionylamino or α-haloacryloylamino when V is a radical of formula (2) wherein Y is α,β-dihalopropionylamino or α-haloacryloylamino.

The dyes of formula (1) according to the invention are fibre-reactive. Fibre-reactive compounds are to be understood as being those which are capable of reacting with the hydroxyl groups of cellulose, with the amino, carboxy, hydroxy or thiol groups in wool and silk or with the amino groups and, possibly, with the carboxy groups of synthetic polyamides, to form covalent chemical bonds.

The sulfo groups present in the dyes of formula (1) are each either in the form of their free acid or preferably in the form of a salt thereof. Salts that come into consideration include, for example, the alkali metal, alkaline earth metal or ammonium salts, salts of an organic amine or mixtures thereof. Examples that may be mentioned are sodium, lithium, potassium and ammonium salts, the salt of mono-, di- or tri-ethanolamine or Na/Li or Na/Li/$NH_4$ mixed salts.

As $C_1$–$C_4$alkyl there come into consideration for $R_1$ and $R_2$ independently of one another e.g. methyl, ethyl, n-propyl, isopropyl, n-butyl, sec-butyl, tert-butyl and isobutyl, preferably methyl or ethyl, especially methyl.

As $C_1$–$C_4$alkoxy there come into consideration for $R_1$ and $R_2$ independently of one another e.g. methoxy, ethoxy, n-propoxy, isopropoxy, n-butoxy, sec-butoxy, tert-butoxy and isobutoxy, preferably methoxy or ethoxy, especially methoxy.

As halogen there come into consideration for $R_1$ and $R_2$ independently of one another e.g. fluorine, chlorine and bromine, preferably chlorine or bromine, especially chlorine.

As $C_2$–$C_4$alkanoylamino there come into consideration for R. e.g. acetylamino and propionylamino, especially acetylamino.

As a group U removable under alkaline conditions there come into consideration, for example, —Cl, —Br, —F, —$OSO_3H$, —$SSO_3H$, —OCO—$CH_3$, —$OPO_3H_2$, —OCO—$C_6H_5$, —$OSO_2$—$C_1$–$C_4$alkyl and —$OSO_2$—N$(C_1$–$C_4$alkyl$)_2$. U is preferably a group of formula —Cl, —$OSO_3H$, —$SSO_3H$, —OCO—$CH_3$, —OCO—$C_6H_5$ or —$OPO_3H_2$, especially —Cl or —$OSO_3H$, more especially —Cl.

Examples of suitable radicals Z are accordingly vinyl, β-bromo- or β-chloro-ethyl, β-acetoxy-ethyl, β-benzoyloxyethyl, β-phosphatoethyl, β-sulfatoethyl and β-thiosulfatoethyl. Z is preferably vinyl, β-chloroethyl or β-sulfatoethyl, especially vinyl or β-chloroethyl.

The sulfo group on the naphthalene ring of the dye of formula (1) is either in the 3-position or the 4-position, preferably in the 3-position.

X is e.g. fluorine, chlorine or bromine, preferably fluorine or chlorine, especially chlorine.

In the reactive dyes of formula (1) according to the invention, $R_1$ is preferably α,β-dihalo-propionylamino or α-haloacryloylamino when V is a radical of formula (3).

n is preferably the number 0 or 1, especially the number 1.

m is preferably the number 0.

The radical of formula (2) in the dye of formula (1) is especially a radical of formula

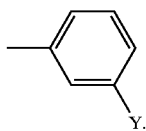

(2a)

The radical of formula (3) in the dye of formula (1) is preferably a radical of formula

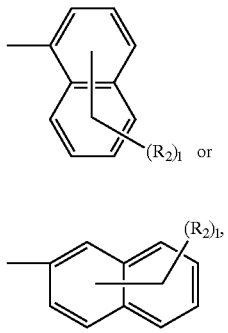

(3a) or (3b)

especially of formula (3a).

$(R_2)_l$ preferably denotes $l$ identical or different substituents selected from the group halogen, hydroxy, nitro and sulfo.

$l$ is preferably the number 0, 1 or 2, especially the number 0.

Y as α,β-dihalopropionylamino or α-haloacryloylamino is preferably α,β-dibromopropionylamino, α,β-dichloropropionylamino, α-bromoacryloylamino or α-chloroacryloylamino, especially α,β-dibromopropionylamino or α-bromoacryloylamino.

Y as a radical of formula —CONH—$(CH_2)_{2-3}$—$SO_2$—Z is preferably a radical of formula —CONH—$(CH_2)_2$—$SO_2$—Z, wherein Z has the definitions and preferred meanings given above, and especially a radical of formula —CONH—$(CH_2)_2$—$SO_2$—$(CH_2)_2$—Cl or of formula —CONH—$(CH_2)_2$—$SO_2$—CH=$CH_2$.

Y is especially α,β-dibromopropionylamino, α,β-dichloropropionylamino, α-bromoacryloylamino or α-chloroacryloylamino, more especially α,β-dibromopropionylamino or α-bromoacryloylamino.

$R_1$ as α,β-dihalopropionylamino or α-haloacryloylamino is preferably α,β-dibromopropionylamino, α,β-dichloropropionylamino, α-bromoacryloylamino or α-chloroacryloylamino, especially α,β-dibromopropionylamino or α-bromoacryloylamino.

$R_1$ is preferably methyl, ethyl, methoxy, ethoxy, α,β-dibromopropionylamino or α-bromoacryloylamino.

$R_1$ is especially methoxy, ethoxy, α,β-dibromopropionylamino or α-bromoacryloylamino.

Preference is given to the reactive dyes of formula

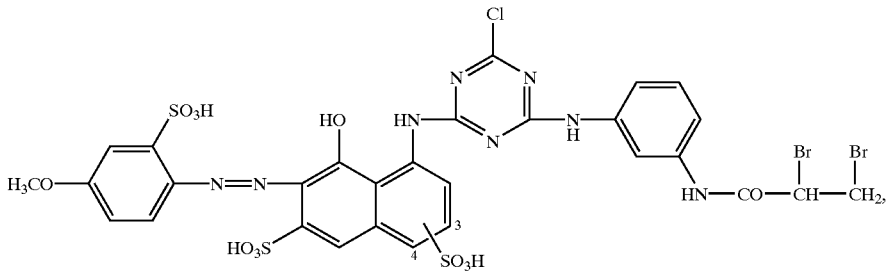

(1a)

especially the reactive dye of formula (1a) wherein the sulfo group is bonded in the 3-position of the naphthalene ring.

Preference is also given to the reactive dyes of formula

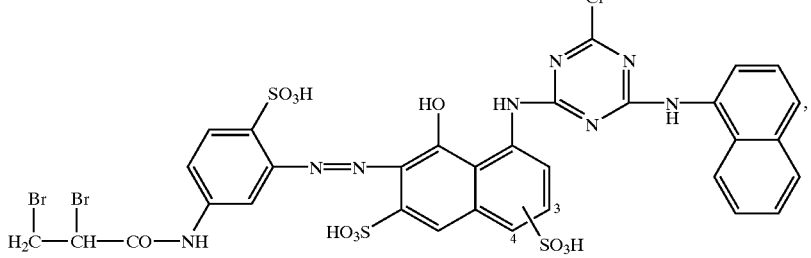

(1b)

especially the reactive dye of formula (1b) wherein the sulfo group is bonded in the 3-position of the naphthalene ring.

The present invention relates also to a process for the preparation of reactive dyes of formula (1) which comprises reacting a compound of formula

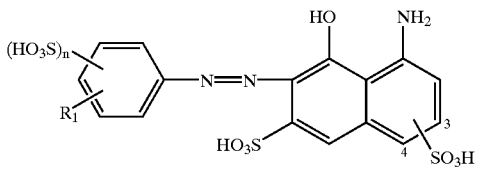
(4)

and an amine of formula $$H_2N{-}V \qquad (5)$$

with a cyanuric halide in any desired order, $R_1$, V and n having the definitions and preferred meanings given above.

Since the individual process steps can be carried out in different orders, including, if desired, simultaneously, various process variants are possible. The reaction is usually carried out stepwise, the order in which the single reactions between the individual reaction components is carried out advantageously being governed by the particular conditions. For example, about one molar equivalent of an amine of formula (5) is reacted with about one molar equivalent of a cyanuric halide and the resulting product is then condensed with about one molar equivalent of a compound of formula (4). In another process variant, for example about one molar equivalent of a compound of formula (4) is reacted with about one molar equivalent of a cyanuric halide and the resulting mixture is then condensed with about one molar equivalent of an amine of formula (5).

Suitable cyanuric halides are, for example, cyanuric chloride and cyanuric fluoride, especially cyanuric chloride.

The individual condensation reactions are carried out e.g. in accordance with processes known per se, generally in aqueous solution, at a temperature of e.g. from 0 to 50° C., especially from 0 to 10° C., and a pH of e.g. from 1 to 10, especially from 1 to 7.

Instead of the compound of formula (4) it is also possible to use the dye precursor of the compound of formula (4) and to convert the resulting intermediates into the desired dyes by diazotisation and coupling.

The end product can optionally also be subjected to a transformation reaction. Such a transformation reaction is, for example, the conversion of a reactive group R, or Y capable of vinylation into its vinyl form by treatment with dilute sodium hydroxide solution, for example the conversion of the β-sulfatoethylsulfonyl or β-chloroethylsulfonyl group into the vinyl-sulfonyl radical or the conversion of the α,β-dihalopropionylamino group into the α-haloacryloylamino radical. Such reactions are known per se. Such a transformation reaction is generally carried out in a neutral to alkaline medium at a temperature of e.g. from 20 to 70° C., at a pH of e.g. from 6 to 14.

Preference is given to a preparation process wherein an amine of formula

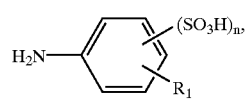
(6)

wherein $R_1$ and n are as defined above, is diazotised and coupled to a compound of formula

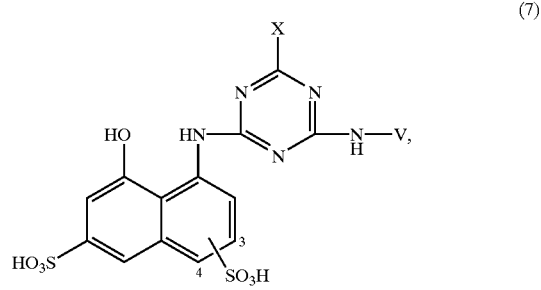
(7)

wherein X and V are as defined above, and optionally the α,β-dihalopropionylamino radical present in the resulting reactive dye is converted into the α-haloacryloylamino radical.

The diazotisation and coupling are effected in a manner known per se. For example, the diazotisation of the amine of formula (6) is generally carried out by the action of nitrous acid in aqueous mineral-acid-containing solution at low temperature, e.g. from 0 to 20° C., while the coupling to the coupling component of formula (7) is carried out at acid to neutral pH values, especially at a pH of from 2 to 6.

In the process according to the invention for the preparation of the reactive dyes of formula (1), the substituents of the compounds of formulae (6) and (7) have the definitions and preferred meanings given above.

The compounds of formulae (4), (5), (6) and (7) are known or can be prepared analogously to known processes.

For example, compounds of formula (7) can be obtained by condensing a compound of formula

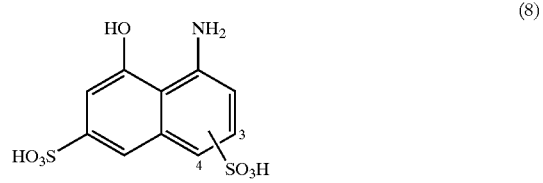
(8)

with a cyanuric halide and condensing the resulting condensation product with an amine of formula (5) given above.

The condensation is effected in a manner known per se, e.g. in aqueous solution at a temperature of, for example, from 0 to 40° C. and a pH of e.g. from 1 to 6. The condensation of the compound of formula (8) with a cyanuric halide, preferably cyanuric chloride, is preferably carried out at a temperature of from 0 to 10° C. and a pH of from 1 to 3. The condensation of the resulting condensation product with the amine of formula (5) is carried out preferably at a temperature of from 0 to 30° C. and a pH of from 4 to 6.

The reactive dyes of formula (1) according to the invention are suitable for dyeing or printing nitrogen-containing or hydroxyl-group-containing fibre materials, paper or leather, e.g. textile fibre materials of cellulose, silk and especially wool and synthetic polyamides.

Preference is given to the dyeing or printing of natural or synthetic polyamide fibre materials, especially synthetic polyamide fibre materials, e.g. polyamide-6 or polyamide-6.6.

The said textile material may be in an extremely wide variety of processing forms, e.g. in the form of fibres, yarns, woven fabrics or knitted fabrics.

The reactive dyes of formula (1) can be used for dyeing or printing in accordance with customary dyeing or printing processes. In addition to water and the dyes, the dyeing liquors or print pastes may comprise further additives, for example wetting agents, anti-foams, levelling agents or agents that influence the properties of the textile material, for example softeners, additives for flame-resistant finishes or dirt-, water- and oil-repellents and also water-softeners and natural or synthetic thickeners, e.g. alginates and cellulose ethers.

The reactive dyes of formula (1) yield level dyeings having good allround properties, especially good fastness to rubbing, to wetting, to wet rubbing and to light. They are also distinguished by uniform colour build-up, good affinity, high reactivity, good fixing ability and very good build-up ability. The dyes according to the invention have good water-solubility and are readily combinable with other dyes.

The following Examples serve to illustrate the invention. The temperatures are given in degrees Celsius. Unless otherwise indicated, parts are parts by weight and percentages relate to percent by weight. Parts by weight relate to parts by volume in a ratio of kilograms to liters.

EXAMPLE 1 a) 24 parts of 2-(α,β-dibromopropionylamino)-aniline-5-sulfonic acid are suspended at a temperature of about 20° C. in 176 parts of water with the addition of 7 parts of sodium chloride and adjusted to a pH of 4.4. The suspension so obtained is diazotised by the addition of 13.5 parts of hydrochloric acid (32%) and 15 parts of 4N sodium nitrite solution. After about 4 hours, excess nitrite is destroyed with sulfamic acid.

b) The diazo component suspension obtained according to a) is adjusted to a temperature of about 10° C. and a pH of 5 and added in the course of about 30 minutes to a solution containing 31.2 parts of the compound which, in the form of the free acid, corresponds to formula

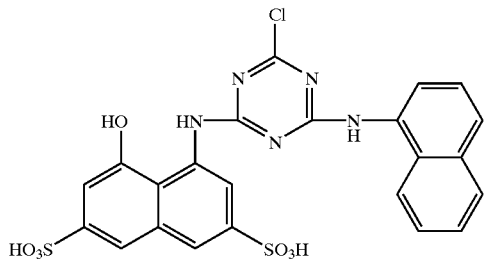

(101)

in 280 parts of water, the solution having been adjusted to a pH of 5. The pH is maintained at a value of 5 by the addition of aqueous sodium hydroxide solution. The reaction solution is then stirred at room temperature until the diazonium salt can no longer be detected, and the product is salted out by the addition of sodium chloride. After filtration, washing with aqueous sodium chloride solution and drying there is obtained a dye which, in the form of the free acid, corresponds to the compound of formula

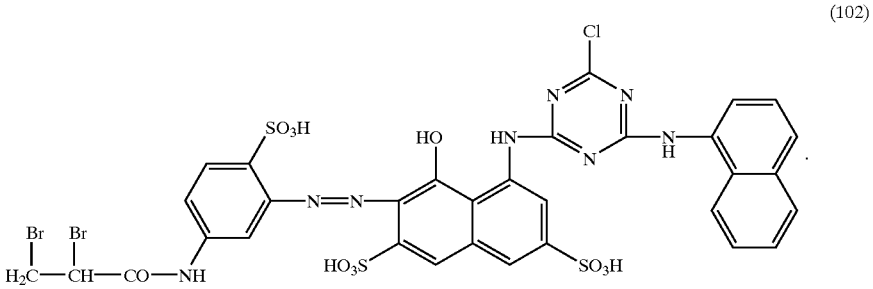

(102)

The dye of formula (102) dyes wool and synthetic polyamide in red shades.

EXAMPLE 2

A diazo component suspension obtained according to Example 1a) is adjusted to a temperature of about 10° C. and a pH of 5 and added in the course of about 30 minutes to a solution containing 31.2 parts of the compound which, in the form of the free acid, corresponds to formula

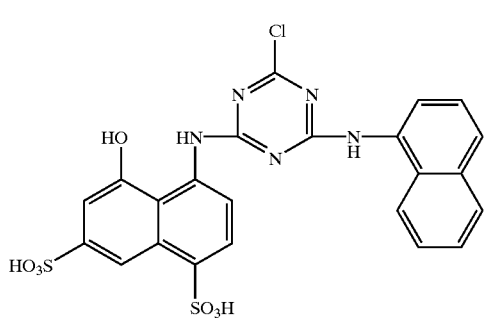

(103)

in 280 parts of water, the solution having been adjusted to a pH of 5. The pH is maintained at a value of 5 by the addition of aqueous sodium hydroxide solution. The reaction solution is then stirred at room temperature until the diazonium salt can no longer be detected. For the purpose of acrylating the resulting product, the reaction mixture is then heated to a temperature of 30° C. and adjusted to a pH of 11 by the addition of aqueous sodium hydroxide solution. After about 30 minutes, the pH is adjusted to a value of 6.5 and the product is salted out by the addition of sodium chloride. After filtration, washing with aqueous sodium chloride solution and drying there is obtained a dye which, in the form of the free acid, corresponds to the compound of formula

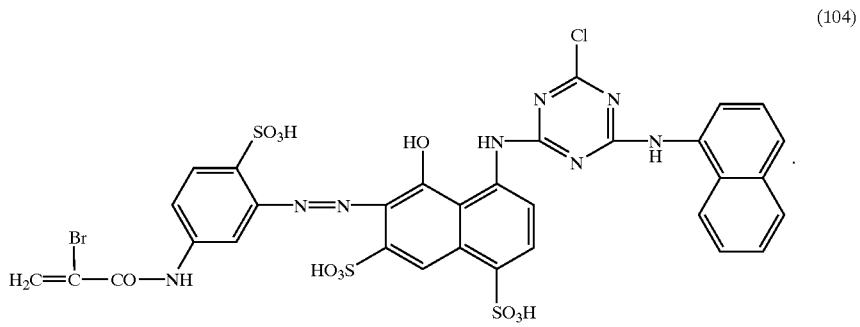
(104)

The dye of formula (104) dyes wool and synthetic polyamide in red shades.

EXAMPLES 3 TO 9

In a manner analogous to that described in Example 1 it is possible to obtain the dyes of formulae

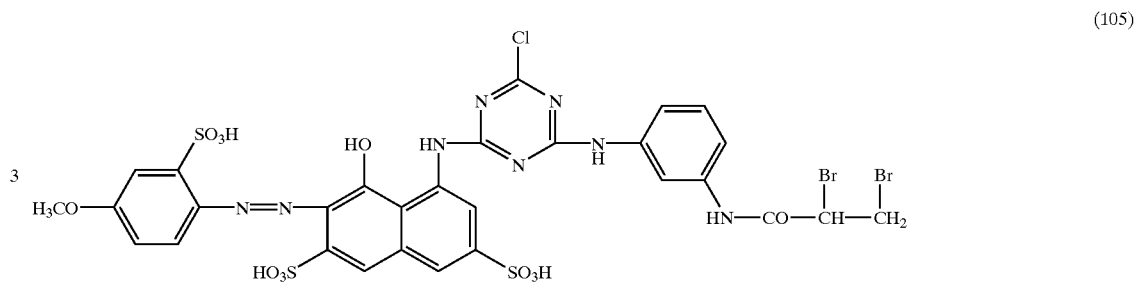
(105)

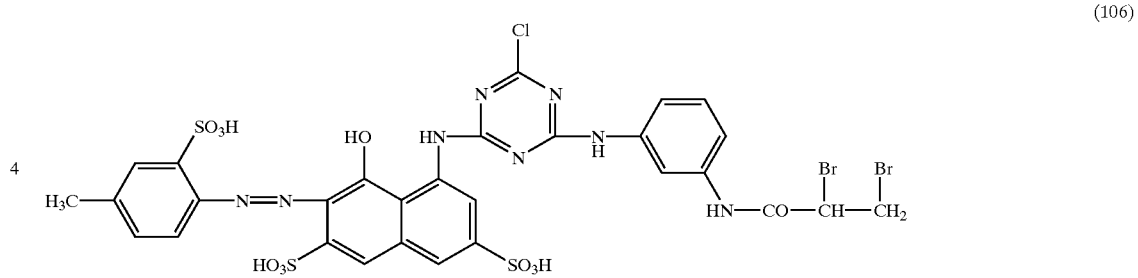
(106)

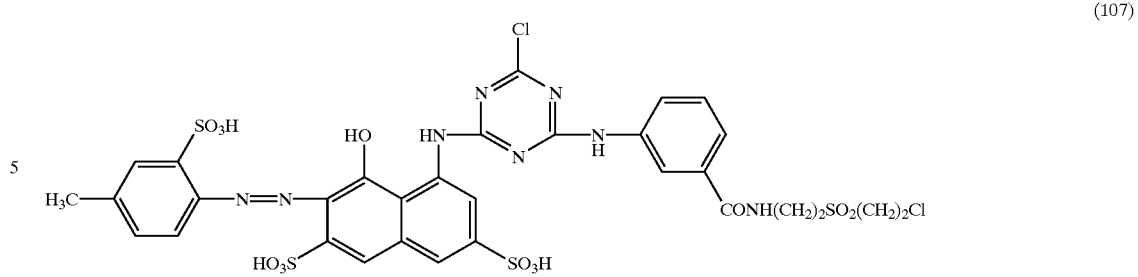
(107)

-continued

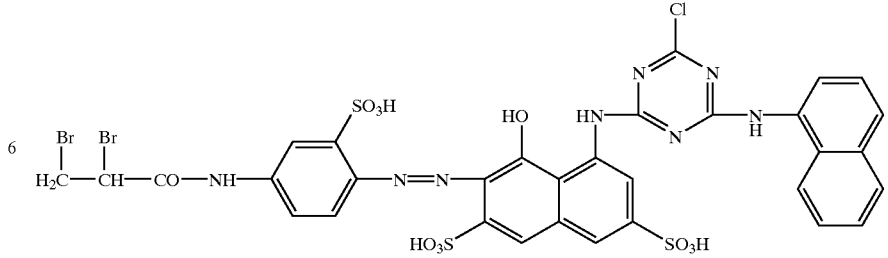
(108)

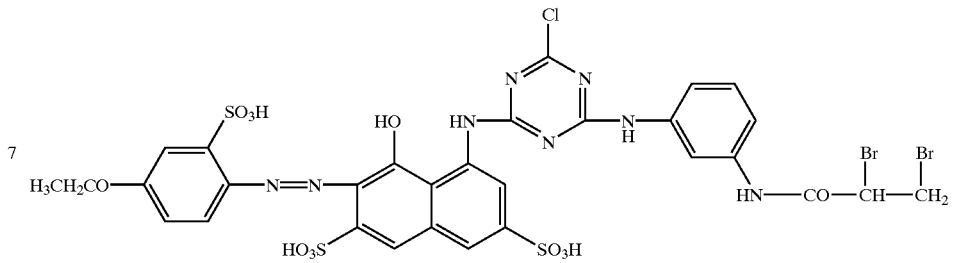
(109)

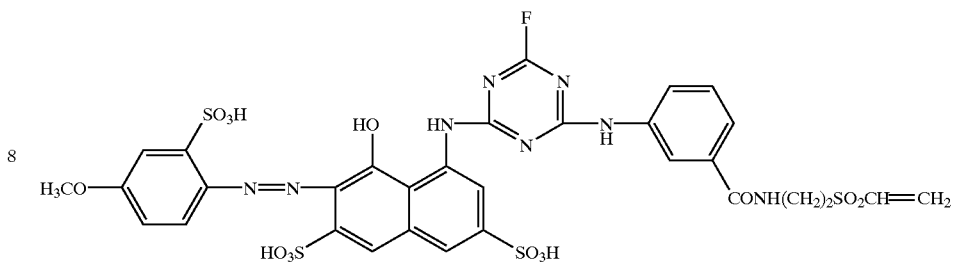
(110)

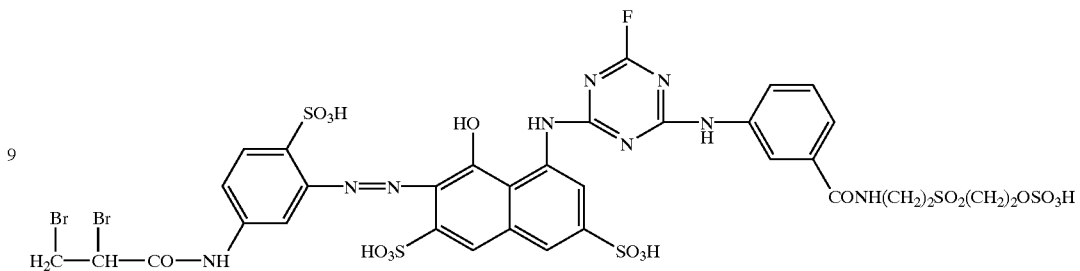
(111)

which dye wool and synthetic polyamide in red shades.

Dyeing Procedure I:

10 parts of polyamide-6.6 fibre material (Helanca stretch jersey) are dyed in 500 parts of an aqueous liquor that contains 2 g/l of ammonium acetate and is adjusted to pH 5 with acetic acid. The content of dye according to Example 1 is 0.8% based on the weight of the fibre. The duration of dyeing at a temperature of 98° C. is from 30 to 90 minutes. The dyed fibre material is then removed and washed and dried as usual.

Dyeing Procedure II:

10 parts of woollen knitting yarn are stirred at 30° C. in a dyebath that contains, per 100 parts of water, 0.8 part of the dye according to Example 1, 0.5 part of sodium sulfate and 2 parts of sodium acetate and has been adjusted to a pH of 4.5 with acetic acid (80%). The liquor is brought to the boil in the course of 45 minutes and maintained at boiling temperature for a further 45 to 70 minutes. The dyed material is then removed, rinsed thoroughly with cold water and dried.

What is claimed is:

1. A reactive dye of formula

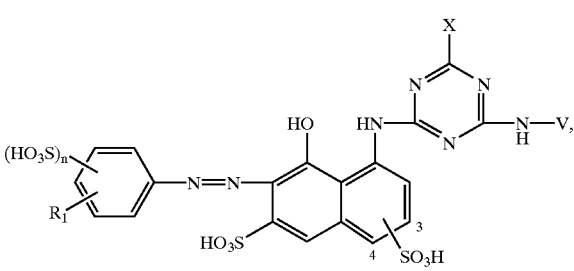
(1)

wherein $R_1$ is halogen, $C_1$–$C_4$alkyl, $C_1$–$C_4$alkoxy, $C_2$–$C_4$alkanoylamino, α,β-dihalopropionylamino or α-haloacryloylamino, X is halogen, n is the number 0, 1 or 2, and V is a radical of formula

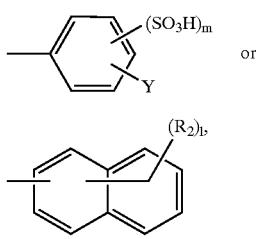

wherein (R$_2$)$_l$ denotes l identical or different substituents selected from the group halogen, hydroxy, nitro, sulfo, C$_1$–C$_4$alkyl and C$_1$–C$_4$alkoxy, Y is α,β-dihalopropionylamino, α-haloacryloylamino or a radical —CONH—(CH$_2$)$_{2-3}$—SO$_2$—Z and Z is vinyl or a radical —CH$_2$CH$_2$—U and U is a group removable under alkaline conditions, m is the number 0 or 1, and l is the number 0, 1, 2 or 3, with the proviso that R$_1$ is not α,β-dihalopropionylamino or α-haloacryloylamino when V is a radical of formula (2) wherein Y is α,β-dihalopropionylamino or α-haloacryloylamino.

2. A reactive dye according to claim 1, wherein X is fluorine or chlorine.

3. A reactive dye according to claim 1, wherein X is chlorine.

4. A reactive dye according to claim 1, wherein n is the number 1.

5. A reactive dye according to claim 1, wherein m is the number 0.

6. A reactive dye according to claim 1, wherein Y is α,β-dibromopropionylamino, α,β-dichloropropionylamino, α-bromoacryloylamino or α-chloroacryloylamino.

7. A reactive dye according to claim 1, wherein Y is α,β-dibromopropionylamino or α-bromoacryloylamino.

8. A reactive dye according to claim 1, wherein R$_1$ as α,β-dihalopropionylamino or α-haloacryloylamino is α,β-dibromopropionylamino, α,β-dichloropropionylamino, α-bromoacryloylamino or α-chloroacryloylamino.

9. A reactive dye according to claim 1, wherein R$_1$ as α,β-dihalopropionylamino or α-haloacryloylamino is α,β-dibromopropionylamino or α-bromoacryloylamino.

10. A reactive dye according to claim 1, wherein R$_1$ is methoxy, ethoxy, α,β-dibromopropionylamino or α-bromoacryloylamino.

11. A reactive dye according to claim 1, which corresponds to formula

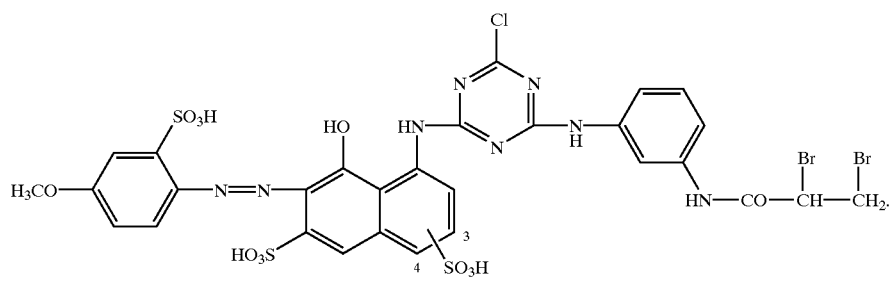

12. A reactive dye according to claim 1, which corresponds to formula

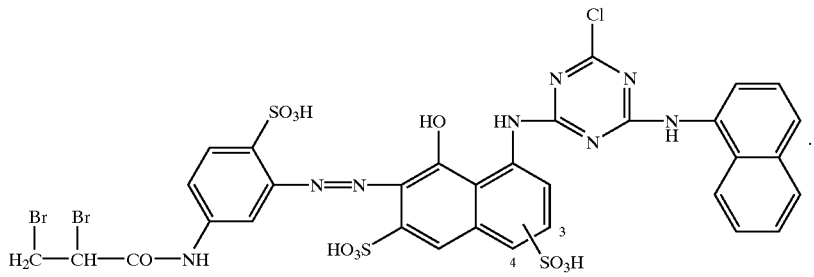

13. A process for the preparation of a reactive dye of formula (1), which comprises reacting a compound of formula

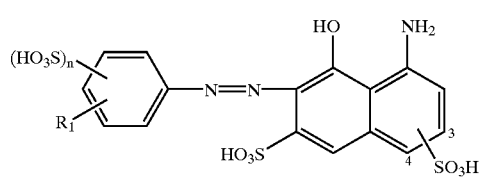

and an amine of formula $$H_2N—V \qquad (5)$$

with a cyanuric halide in any desired order, $R_1$, V and n being as defined in claim 1.

14. A process for dyeing or printing hydroxyl-group-containing or nitrogen-containing fibre materials, which comprises applying to said fibre materials a reactive dye according to claim 1.

15. A process according to claim 14, wherein said fibre material is natural or synthetic polyamide fibre material.

16. A process according to claim 14, wherein said fibre material is synthetic polyamide fibre material.

* * * * *